United States Patent [19]

Müller

[11] 3,945,418
[45] Mar. 23, 1976

[54] LINKAGE ARRANGEMENT FOR ANTISKID VEHICLE TIRE CHAINS

[75] Inventor: Anton Müller, Unterkochen, Germany

[73] Assignee: Eisen- und Drahtwerk Erlau Aktiengesellschaft, Aalen, Germany

[22] Filed: June 26, 1974

[21] Appl. No.: 483,106

[30] Foreign Application Priority Data
June 30, 1973 Germany............................ 2333462

[52] U.S. Cl. ................................................ 152/243
[51] Int. Cl.² ........................................... B60C 27/02
[58] Field of Search ........... 152/231, 232, 241, 242, 152/243, 285, 287; 403/116, 115

[56] References Cited
UNITED STATES PATENTS
3,796,246   3/1974   Walenta.......................... 152/243 X FOREIGN PATENTS OR APPLICATIONS
1,431,440   1/1966   France................................ 152/243

*Primary Examiner*—Drayton E. Hoffman
*Assistant Examiner*—Norman L. Stack, Jr.
*Attorney, Agent, or Firm*—Walter Becker

[57] ABSTRACT

A linkage arrangement for antiskid vehicle tire chains in which a web link in a plane perpendicular to the tire surface is pivotally linked to a substantially circular link which is parallel to the tire surface. The interengaging regions of said links are convex toward each other and vary not more than a small amount in curvature. The links are so configured within the region of pivotal interengagement thereof as to present cooperating elements of abutment means to one another which limits the relative pivotal movement thereof to about 90° in the direction toward and away from the surface.

12 Claims, 15 Drawing Figures

U.S. Patent March 23, 1976 3,945,418
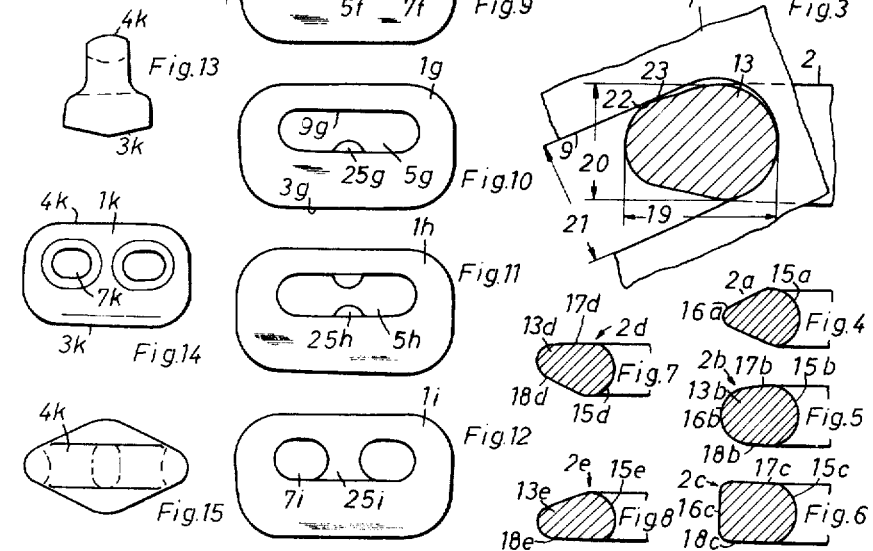

LINKAGE ARRANGEMENT FOR ANTISKID VEHICLE TIRE CHAINS

The present invention relates to a link connection for tire chains with at least two interengaging links which in working position are pivotable about a main axis parallel to the tire surface. Of these interengaging links, a first link has a bearing opening for the pivotable engagement by a bearing section of the second link over a predetermined maximum angle in the direction toward the tire engaging side.

It is an object of the present invention so to design a link connection of the above mentioned type that when being arranged in a tire chain, a certain stiffness of the tire chain against deformations of the latter by folding will be effected so that for instance also with a tire chain which is loosely placed upon a tire, that portion of the tire chain which is being lifted off from the tire will not buckle but will merely curve.

These and other objects and advantages of the invention will appear more clearly from the following specification in connection with the accompanying drawing, in which:

FIG. 1 shows a link connection according to the invention partially in view and partially in section.

FIG. 2 is a section taken along the line II—II of FIG. 1. FIG. 3 is a cutout from FIG. 1 but on a larger scale and in abutting connection.

FIG. 4 illustrates a further embodiment of one link of the link connection as a cutout in an illustration similar to that of FIG. 1.

FIGS. 5–8 show further embodiments of the invention in an illustration similar to that of FIG. 4.

FIG. 9 is a further embodiment of the other link shown in view similar to that of FIG. 1.

FIGS. 10–12 represent additional embodiments of the invention illustrated in a manner similar to that of FIG. 9.

FIG. 13 shows still another embodiment of the link according to the invention and more specifically as a longitudinal view.

FIG. 14 shows a link of FIG. 13 as seen from the right-hand side with regard to the drawing.

FIG. 15 is a top view of the link of FIG. 14.

The link connection according to the present invention is characterized primarily in that of at least two interengaging links, the first link within the region of the bearing opening has an abutment for a counterabutment of the second link which counterabutment is provided in spaced relationship to the main axis within the region of the bearing section, said counterabutment engaging said first mentioned abutment at a maximum angle of less than 90°.

As a rule, this maximum angle should be considerably less than 90°, preferably less than 45°, namely for instance at a maximum 20°. The two links are at this angular position blocked in a positive manner against further movement in the same direction about the main axis so that adjacent links of the link connection cannot place themselves upon each other whereby the tire chain is protected to a great extent.

Referring now to the drawings in detail, the link connection shown in FIGS. 1–3 comprises a first link 1 and a second link 2 engaging said first link 1. The first link 1 is designed as a web link which in view may for instance be nearly rectangular while one longitudinal side 3 thereof forms a ground engaging surface and the other a longitudinal edge 4 facing away from the side 3 forms a tire engaging surface. Between these two longitudinal edges 3 and 4 there is provided a flat oval link opening 5 which is closer to the tire engaging surface 4 than to the ground engaging surface 3 so that a relatively large portion of the height of the web link 1 is available as wear volume. The link opening 5 which for instance extends over approximately two-thirds of the total length of the web link 1 and extends through the side surfaces 6 of the latter forms with its ends two bearing openings 7 for engagement by the second link 2. In this way, alternately first and second links 1 and 2 can be connected to each other. Each bearing opening 7 shows in a view according to FIG. 1 a semicircular bearing cup 8 which merges with the other bearing opening through the intervention of the longitudinal surfaces 9 of link opening 5, said surfaces 9 being parallel to each other. The spacing of the longitudinal surfaces 9 from each other equals at least approximately the diameter of the bearing seat or cup 8.

Each bearing opening 7 defines a bearing axis forming the main axis 10 about which the two interengaging links 1, 2 can be pivoted relative to each other. This main axis 10 is located at the right angle to the central plane 11 of the first link 1 and is parallel to the central plane 12 of the second link 2.

The second link 2 may for instance be designed as a welded circular link the outer diameter of which is slightly greater than the the length of the first link while the inner diameter of said circular link may approximately equal the length of the link opening 5. The second link may have a uniform cross section over its entire circumference so that it will be able with each desired section of its circumference to engage the pertaining bearing opening 7 to the same extent while forming with said section a bearing section 13 which with regard for instance to the central axis 14 of the annular member 2 covers an arc angle of approximately 40°. The second link 2 will, since it has approximately uniform cross section over its circumference, be able to turn about its ring axis relative to the first link 1 in a continuous manner while with regard to the abutment effect, identical conditions prevail so that a very uniform wear of the second link 2 will be assured. In axial section through the annular member 2, in other words in a section at a right angle to the main member 10, the bearing section 13 forms a convexly curved bearing surface 15 which extends over an arc angle of more than 180° and is formed by the inner surface of the annular link 2. The diameter of curvature of the bearing surface 15 is by approximately one-tenth less than the diameter of the bearing seat 8. In this way, the second link 2 will have a play of movement which is sufficient on one hand for self-cleaning of the link connection and on the other hand will be precisely guided. That side 16 of the bearing section 13 which in the above mentioned axial section faces away from the bearing surface 15, and which is formed by the outer circumference of the annular link 2, likewise forms the part of a circle but with a smaller arc angle than 180° and is rounded with a smaller radius of curvature than the bearing surface. The two rounded sections 15, 16 in the above mentioned axial section merge with each other through plane outer surface parts 17, 18 which parts 17, 18 are tangentially adjacent to the roundings and are formed by the oppositely truncated cone-shaped end faces of the annular link 2 whereby a further decrease in the wear will be obtained. Inasmuch as at least one outer surface portion 17, 18 of the bearing section 13 is plane in cross section which outer surface portion 17, 18 is in cross section adjacent to the bearing surface 15, an engagement over a relatively large surface is obtained with the longitudinal surface 9 of the bearing opening 7. The radius of curvature of the rounded side 16 corresponds approximately to three-fourths of the radius of curvature of the bearing surface 15 and approximately equals the distance between the two central axes of the cross sectional roundings 15, 16 which are located in the central plane 12 of the annular link 2 in such a way that said link 2 is symmetrically arranged with regard to the central plane 12.

Inasmuch as the bearing opening 7 with an end surface forms the bearing seat 8 for the slideable engagement of the bearing surface 15 of the bearing section 13, a slight specific bearing compression and thus a slight wear will be assured. The transverse extension 19 of the bearing section 13 as measured parallel to the central plane 12 and radial central axis 14 is greater than the width 21 of the bearing opening 7 and link opening 5 with said width 21 measured at the right angle to the running plane and running surface 3. On the other hand the cross sectional extension 20 of the bearing section 13 as measured at a right angle to the central plane 12 and parallel to the central plane 14 is less than the width 21 of the bearing opening 7 and link opening 5 as measured at a right angle to the running plane and running surface 3. Thus, the two links 1 and 2 can be pivoted about the main axis 10 from their central position according to FIG. 1 in both directions only about a predetermined angle relative to each other and are then relative to each other limited by their abutment. The bearing section 13 forms in a region remote from the bearing surface 15 with its outer surface a counterabutment 23. Such counterabutment 23 is located for instance in the merging region between the rounding 16 and the outer surface portion 17, 18. This counterabutment 23 has coordinated therewith a section of the pertaining longitudinal surface 9 of the bearing opening 7 and link opening 5 which section forms an abutment 22. By correspondingly dimensioning the width of the bearing opening 7 and of the cross section of the bearing 13, the angle can be determined within which the two links 1 and 2 are limited relative to each other for engagement with each other. The bearing opening 7 may approximately over its entire length have the same width so that the second link 2 can also move at a right angle with regard to the bearing axis 10 relative to the first link 1. This displacement is, however, for all practical purposes possible only when the abutment position has not been reached because in said abutment position a very high friction occurs which prevents the displacement.

In order to be able to select the width of the bearing opening 7 relatively small and in order to assure a low weight of the second link 2, the bearing section 13 has within the region of the abutment 23 a smaller cross sectional thickness that it has within the region of the bearing surface 15, the cross section preferably steadily decreasing from the region of the bearing surface 15 on.

As will be evident from FIG. 2, the respective bearing seat 8 is in its axial section through the main axis 10 curved convexly with a radius of curvature which equals half the inner diameter of the annular link 2 so that the bearing surface 15 of the bearing section 13 nearly rests over the entire thickness of the web member 1 against the bearing seat 8. The sides 24 of the bearing seat 8 merge in this cross section with the side surfaces 6 of the web link 1 while being rounded over a portion of a circle, so that during tilting movement of the two links 1 and 2 toward each other about axes 1 arranged at a right angle to the main axes 10, a jamming will be avoided.

FIGS. 4–12 show a further embodiment of the invention in which parts corresponding to those of FIGS. 1–3 are designated with the same reference numerals but in FIG. 4–12 with the index $a$ to $i$, respectively. The annular link $2a$ illustrated in FIG. 4 has in cross section an outer rounded section $16a$ the diameter of curvature of which corresponds only to approximately one-third to one-fourth to the diameter of curvature of the bearing surface $15a$, while the distance between the two central axes of the two round sections $15a$, $16a$ is greater than the radius of curvature of the bearing surface $15a$.

The cross section of the annular link $2b$ according to FIG. 5 is shaped in approximately the form of an ellipse so that the bearing surface $15b$ and the cross sectional side $16b$ facing away therefrom are curved with the same radius of curvature and through less sharply curved outer surface parts $17b$, $18b$ which from the end faces of the annular member $2b$ merge with each other so that also the longer ellipse axis is parallel to the tire surface. In this way, a relatively soft rolling of the bearing section in the bearing opening will be obtained until the abutment position has been reached. With the embodiment illustrated in FIG. 6 the outer circumferential surface of the annular link $2c$ is substantially cylindrical whereas the end surfaces of the annular link $2c$ are plane and are located at the right angle to the axis of the annular ring. In the cross section according to FIG. 6, the outer surface parts $17c$, $18c$ merge over a quarter of a circle with the side $16c$ of the bearing section which side $16c$ faces away from the bearing surface $15c$, when the outer surface parts $17c$, $18c$ merge tangentially with the bearing surface $15c$.

The cross sections illustrated in FIGS. 1–6 are asymmetric with regard to the central plane of the annular link. According to the embodiment of FIG. 7, the cross section of the annular link $2d$ is assymetric with regard to its central plane while one end face is plane and the other end face is in the shape of a truncated cone so that in cross section one outer surface portion $17d$ of the bearing section is at a right angle to the central axis of the annular ring whereas the other outer surface portion $18d$ is inclined thereto. The bearing surface $15d$ is cross sectionwise curved over an arc angle of more than 180° with the same radius of curvature. The bearing section $13d$ is within the region of the bearing surface $13d$ and/or within the region of the counterabutment asymmetric to an axial plane which is parallel to the tire surface and passes through the main axis so that the two links are adapted to be pivoted from the stretched out position in both possible pivoting directions about the main axis about different angles up to the respective abutment position.

With the embodiment according to FIG. 8 in contrast to FIG. 7, the bearing surface $15e$ is curved over an arc angle of less than 180° with the same radius of curvature while said surface $15e$ through the intervention of a rounded portion with smaller radius of curvature merges with the plane end face of the annular link $2e$ and with the outer surface portion $18e$ of the bearing section $13e$, said surface section $13e$ being formed by said plane end face of said annular member $2e$. As will be evident from FIGS. 7 and 8, the plane end face of the annular link may either face away from the running plane of link 1 or may face toward same.

With the web link 1f according to FIG. 9, a separating cam 29 is provided in the center of the length of the link opening 5f and more specifically on that longitudinal side 9f of opening 5f which faces toward the tire engaging surface 4f. Cam 25 may for instance in the manner of a web extend over the entire thickness of the web member 1f and may have a height which is only approximately one-fourth of the width 21f of the link opening 5f. By means of said cam 25, the two bearing openings 7f are separated from each other in such a way that the bearing section extending into the respective bearing opening 7f cannot be moved past the separating cam 25 so that the two second links 2f engaging the two bearing openings 7f cannot contact each other.

With the embodiment of FIG. 10, the separating cam 25g is provided on that longitudinal side 9g of the link opening 5g which is adjacent the ground contacting surface 3g and is formed by a cam which is set back relative to the lateral surfaces of the web link.

With the embodiment of FIG. 11, both longitudinal sides of the link opening 5h are provided with oppositely located separating cams 25h.

As will be seen from FIG. 12, the web link 1i may also have two completely separate bearing openings 7i which are both flat oval and are separated from each other by intermediate web 25i of the link 1i.

The web link 1k illustrated in FIGS. 13–15 has a ground contact surface 3k which is rhomboidal in plan view and is symmetric to its longitudinal central plane. This ground contact surface is formed by a widened web section which extends up to the bearing openings 7k so that the second link will be able to rest on that side of said web section which faces away from the ground contacting surface 3k, and in the blocked position a still better support will be assured. The web section located on the other side of the bearing openings 7k and forming the tire engaging surface 4k is narrow and has parallel lateral surfaces which extend to the web section forming the ground contact surface 3k so that the tire engaging surface 4k is less than half as wide as the ground contacting surface within the region of its greatest width and within the region of the center of its length. The web section forming the ground contacting surface 3k is in cross section and in longitudinal section trapezoidal according to FIG. 13 and has upwardly tapering side surfaces which through the intervention of S-shaped rounded portions merge with the side surfaces of the other web section. The bottom contacting surface 3k is formed by two individual substantially plane surfaces which are located at an obtuse angle with regard to each other. These individual plane surfaces merge with each other at an obtuse angle along the longitudinal central plane of the link 1k in such a way that the ground contacting surface projects farthest in this longitudinal central plane. Each individual surface merges with the respective pertaining side surface at an angle of slightly more than 90°.

It is feasible to compose preferably alternately interengaging first and second links 1 and 2 so as to form a link connection which in the tire circumferential direction is provided to extend over the entire tire chain but does not have to extend over its entire width so that the tire chain is limited only in at least one certain region of its width by the abutment effect as to its flexible movability. However, it is also possible that preferably alternately interengaging first and second links 1 and 2 form a continuous link connection which extends approximately over the entire width of the tire chain while such link connection may in the tire circumferential direction be uniformly distributed and may be provided in spaced relationship to each other.

However, it is particularly expedient when the running section and/or at least one side portion of the tire chain consists exclusively of alternately interengaging first and second links 1 and 2. The first and second links 1 and 2 may form chain strands which are located at a right angle with regard to the running direction or are inclined thereto or are located in running direction and possibly they may form polygonal chain meshes located in a corresponding arrangement on the tire.

In view of the design according to the invention, a very high resistant moment of the first link and thus an increased pull resistance is obtained. Therefore, the first link designed according to the invention is also suitable per se in such tire chains which are exposed to a high inner wear. Due to the design of the tire chain according to the invention, the tire chain when loosely mounted will follow a curved or bulged path so that the tire chain in driving direction will be laid down in front of the tire in the manner of a steel carpet or the manner of a caterpillar and can then be driven over by the tire so as to be made smooth or flat. In this connection, it is similar to a steel carpet, no gripping ability is required, the friction between tire and tire chain will be decisive. Inasmuch as this friction is naturally very high, this tire chain also makes it possible to move on inclinations although the tire chain itself with its web-shaped bottom sides has a high wear resistant volume but need not have any gripping cleats or dogs or the like.

It is, of course, to be understood that the present invention is, by no means, limited to the specific showing in the drawing but also comprises any modifications within the scope of the appended claims.

What is claimed is:

1. In combination with an antiskid tire chain; at least two links interengaged so as to be pivotal relatively about a main axis substantially parallel to the tire surface adjacent thereto, the first of said links being a member with non-round cross section having an elongated opening of greater length than width through which said second link passes, said first link having a bearing surface at one end of said opening and said second of said links having a surface arcuate in cross section on said bearing portion in engagment with said bearing surface and said link in cross section having sides extending from said bearing surface outwardly toward its periphery which converge to form a tapered part, said link in cross section having a maximum dimension perpendicular to said main axis from said bearing surface to the periphery of said link at said tapered part greater than the width of the elongated opening in said first link, so that said links may angle about said main axis perpendicular to the central plane of said first link and form cooperating elements of abutment means on said links operable to limit the relative pivotal movements of said links about said main axis, said cooperating elements being spaced from the said main axis and positively limiting the relative pivotal movement between both of said links to less than 90° maximum about said main axis.

2. A tire chain in combination according to claim 1 in which said first link is in the form of a web link having its central plane in a plane perpendicular to said main axis, the inner surfaces of the opening of the first link leading away from said bearing surface being substantially parallel and spaced a lesser distance than said greater dimension of said integral part.

3. A tire chain in combination according to claim 1 in which said first link is an elongated web link and the inside surfaces thereof leading away from said bearing surface are substantially parallel, said second link in cross section having a longer axis in the direction of the length of said first link than in the direction perpendicular to the length thereof, said second link in cross section having a larger region toward the inside and a smaller region toward the outside and tapering side surfaces joining said regions.

4. A tire chain in combination according to claim 1 in which each of said bearing surface and bearing portion are convex in cross section toward the center of the respective link, said bearing portion being symmetrical about an axial plane perpendicular to said main axis at the region of interengagement of said bearing surface and bearing portion.

5. A tire chain in combination according to claim 1 in which each of said bearing surface and bearing portion are convex in cross section toward the center of the respective link, said bearing portion being nonsymmetrical about an axial plane perpendicular to said main axis at the region of interengagement of said bearing surface and bearing portion, one side surface of said second link being substantially parallel to the tire surface and the other side surface of said second link converging with said first side surface thereof in the radially outward direction of said second link.

6. A tire chain in combination according to claim 1 in which said bearing portion of said second link in cross section perpendicular to said main axis has the portion facing said bearing surface of said first link convexly rounded at a larger radius and the portion facing away from said bearing surface convexly rounded at a smaller radius, and flat side surfaces on said second link tangentially merging with said rounded portions.

7. A tire chain in combination according to claim 1 in which said bearing portion of said second link in cross section perpendicular to said main axis has the portion facing said bearing surface of said first link and the portion facing away from said bearing surface convexly rounded at a smaller radius while the side faces of said second link merge with said rounded portions and is convex outwardly at a larger radius.

8. A tire chain in combination according to claim 1 in which said first link is a web-type link with the inside surfaces leading away from said bearing surface substantially parallel, said second link being substantially circular when viewed from the side and being noncircular in cross section with the greater dimension in a plane perpendicular to said main axis.

9. A tire chain in combination according to claim 1 in which said first link is a web-type link and has a said bearing surface at each end thereof with a common link opening connecting said bearing surfaces.

10. A tire chain in combination according to claim 1 in which said first link is a web-type link and has a said bearing surface at each end thereof with a common link opening connecting said bearing surfaces, and at least one separating protruberance on the inside of said first link protruding into said opening.

11. A tire chain in combination according to claim 1 in which said relative pivotal movement of the links is limited to about 20° to 45° by said cooperating elements of abutment means on the links.

12. A tire chain in combination according to claim 1 in which said first link is a web-type link having longitudinal tire engaging and road engaging surfaces and a said bearing surface at each end engaged by a respective second link, each end of said first link having an elongated opening therein with the respective bearing surface at the outer end thereof.

* * * * *